Oct. 26, 1965  A. J. GRANATA  3,213,634
METHOD AND APPARATUS FOR INDIVIDUAL QUICK FREEZING
Filed May 5, 1964
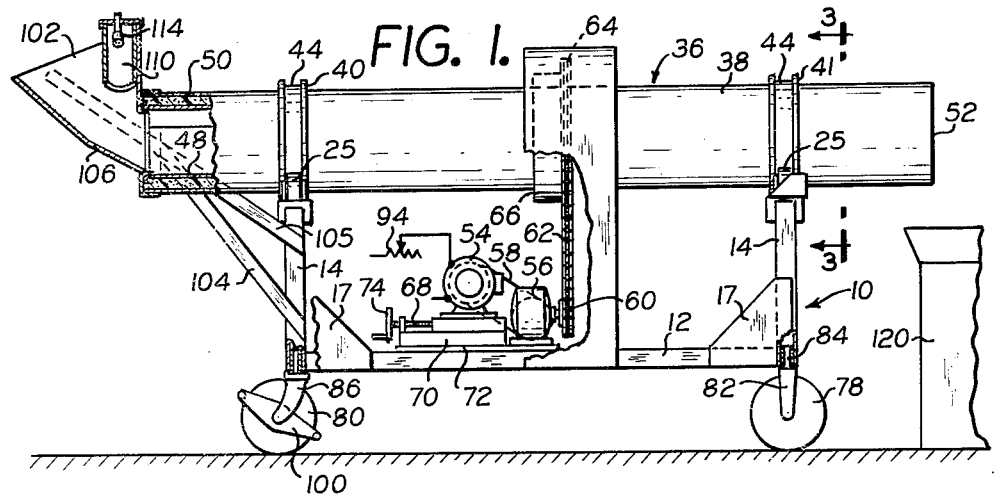
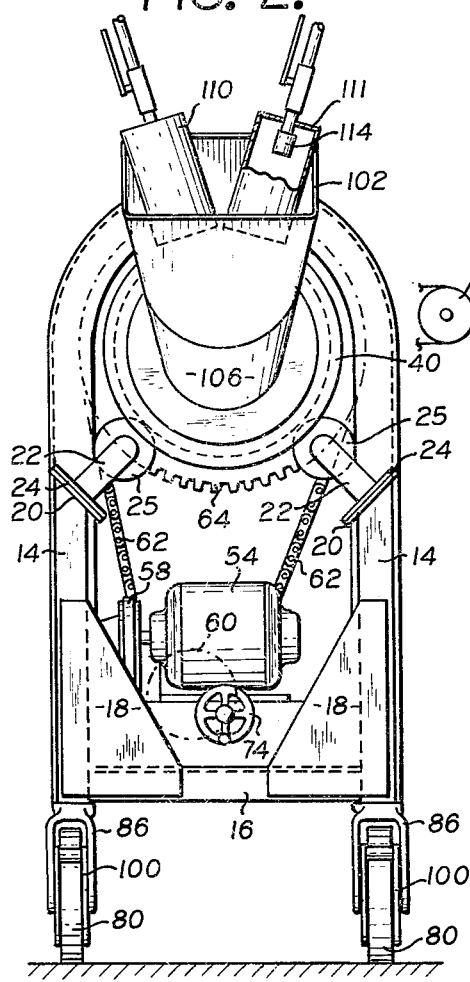
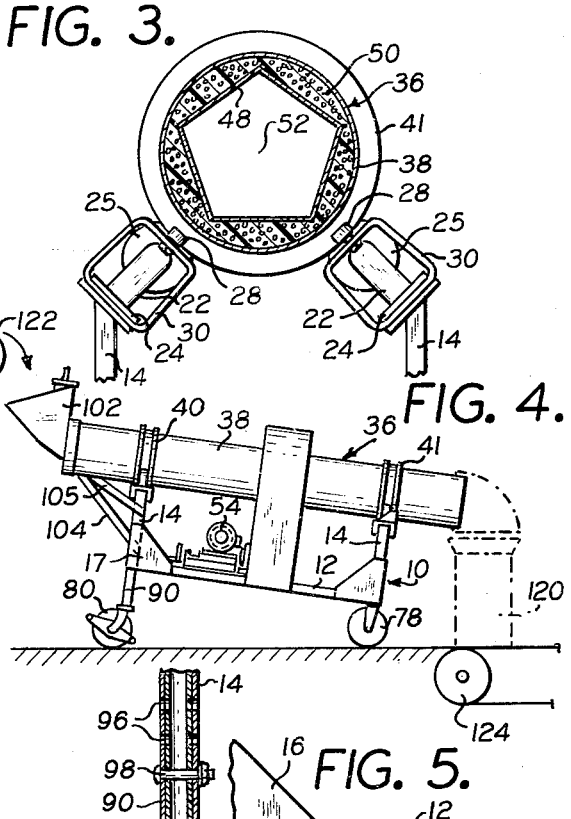
INVENTOR
Anthony J. Granata
BY Edmund W. Bopp
AGENT.

United States Patent Office 3,213,634
Patented Oct. 26, 1965

3,213,634
METHOD AND APPARATUS FOR INDIVIDUAL QUICK FREEZING
Anthony J. Granata, Locust Valley, N.Y., assignor to Air Reduction Company, Incorporated, New York, N.Y., a corporation of New York
Filed May 5, 1964, Ser. No. 364,945
11 Claims. (Cl. 62—63)

This invention relates to methods and apparatus for individual quick-freezing of pieces of food.

One of the problems in quick-freezing of small food pieces, such as shrimp, diced meat and other kinds of food consisting of many relatively small pieces, is that the freezing processes stick the pieces together in a solid block so that it is necessary to thaw an entire package when a consumer wants to use only a part of the package.

It is an object of this invention to provide an improved method and apparatus for quick-freezing individual pieces of food so that they can be packaged in their individually frozen condition to permit the ultimate consumer to remove as much or as little of the contents of the package while leaving the remaining pieces in the package in their frozen condition.

Another object is to provide an improved method and apparatus for freezing food by contact with carbon dioxide and at atmospheric pressure. This makes the apparatus much more economical to manufacture and safer to use, as compared with equipment in which the refrigerant is under pressure. It also has the important advantage of permitting continuous freezing operations where the food items are supplied continuously at one end of the freezing apparatus and are withdrawn continuously at the other end of the apparatus. It may be said, therefore, that another object of the invention is to provide an improved continuous process for individual quick-freezing of food pieces, and apparatus for carrying out the process.

The invention uses solid phase carbon dioxide in particulate form selected from a class consisting of carbon dioxide snow, and crushed, solid carbon dioxide, as the refrigerant, and tumbles the food items in the snow or crushed carbon dioxide to obtain an intimate contact of the food items with the refrigerant. The solid carbon dioxide provides a soft substance to protect the food items from physical damage as the result of contact with one another and with the container during the tumbling and while the food items are soft and unfrozen. Although the carbon dioxide sublimes by the time the food items reach the discharge end of the apparatus, the food items are frozen by the time the carbon dioxide has sublimed and they are no longer liable to injury with the limited amount of remaining tumbling that is used for this invention.

Other objects, features and advantages of the invention will appear or be pointed out as the description proceeds.

In the drawing, forming a part hereof, in which like reference characters indicate corresponding parts in all the views:

FIGURE 1 is a side elevation of apparatus for freezing the pieces of food in accordance with the method of this invention;

FIGURE 2 is an enlarged end view of the apparatus shown in FIGURE 1, the view being taken from the left end of FIGURE 1;

FIGURE 3 is an enlarged fragmentary sectional view taken on the line 3—3 of FIGURE 1;

FIGURE 4 is a diagrammatic view, on a reduced scale, showing the apparatus of FIGURE 1 in operating position and showing it used with conveyors for supplying food to the apparatus and for removing frozen food from the other end of the apparatus; and FIGURE 5 is an enlarged, fragmentary sectional view of the adjustable wheel connections at the left-hand end of the apparatus shown in FIGURE 1.

The apparatus shown in the drawing includes a portable carriage 10 which is made with a frame having longitudinal elements 12 and vertical elements 14; there being a vertical element 14 at each of the corners of the frame. There are transverse structural elements 16 extending between the longitudinal elements 12 on both sides of the frame. The vertical elements 14 are rigidly secured to the longitudinal elements 12 by gussets 17 which are preferably welded but may be secured in other ways to the frame elements. The vertical elements 14 are rigidly connected with the transverse structural elements 16 by other gussets 18 (FIGURE 2) by welding or other fastening means.

A plate 20 is rigidly connected to the upper end of each of the vertical elements 14. A bracket 22, having a bottom plate 24, is attached to the plate 20; and there is a roller 25 supported by bearings on the upper end of each bracket 22.

The rollers 25, toward the right-hand end of the apparatus, are associated with other smaller rollers 28 (FIGURE 3), which serve as thrust bearings. Each of the thrust rollers 28 is carried on a bearing at the top of a special bracket 30 supported from the plate 24 or from some other rigid part of the structure at the upper end of the vertical element 14.

There is a tube 36 supported by the rollers 25. This tube 36 has an outside shell 38, which is preferably made of metal, of sufficient gauge to give the tube the rigidity necessary to prevent it from bending when supported only at the rollers 25.

There are rings 40 and 41 (FIGURE 1) secured to the outside of the shell 38 and each of these rings 40 and 41 has a circumferential channel 44 which provides a track in which the rollers 25 run when the tube 36 is rotated about its longitudinal axis.

The tube 36 has an inside wall 48 which is preferably made of metal or other smooth material; and this inside wall 48 (FIGURE 3) is of polygonal cross section. In the drawing, the wall 48 is shown with five sides. This number is particularly advantageous for obtaining the tumbling action desired for this invention. Fewer sides can be used, such as three or four, but this has the disadvantage of greatly reducing the open area within the tube. More than five sides can be used, but as the number of sides is increased, the amount of tumbling action is reduced and if the cross section of the inside wall 48 approaches a circle, no adequate tumbling action is obtained.

The inside wall 48 is supported from the outside wall 38 by thermal insulation 50 which is preferably a plastic foam. If soft and easily compressible thermal insulation is to be used, the inside wall 48 can be supported from the outside wall by struts which span the insulation space between the walls 38 and 48.

The tube 36 is rotated about its longitudinal axis 52 by a motor 54 (FIGURE 1) which drives a speed-reducer 56 through a belt 58. At the low-speed end of the speed-reducer 56 there is a sprocket 60 which drives a chain 62. This chain 62 passes around a sprocket 64 attached to a collar 66 on the outside shell of the wall 38 of the tube 36. The tension of the belt 58 is regulated by a lead screw 68 which shifts the motor 54 lengthwise along a supporting base 70 carried on a plate 72 attached across the longitudinal elements 12 of the carriage frame. The screw 68 is adjusted manually by a hand wheel 74.

The carriage 10 has front wheels 78 and back wheels

80. All of the wheels are preferably casters. Each of the front wheels 78 is connected with the carriage frame by a bracket 82 having a stud 84 at its upper end extending into a bearing in one of the vertical elements 14.

Each of the back wheels 80 has a bracket 86 (FIGURE 5) with a stud 88 extending into a sleeve 90 located in one of the vertical elements 14 at the back of the carriage. The sleeve 90 telescopes into the vertical element 14 and can be moved with the telescoping action to shift the bracket 86 toward and from the lower end of the carriage frame.

Thus moving the sleeve 90 downwardly in the vertical element 14 raises the rearward end of the carriage so that the tube 36 slopes downward toward the other end of the carriage in the manner illustrated in FIGURE 4. This slope of the tube causes the pieces of food to move toward the low end of the tube as the pieces are tumbled by rotation of the tube. By changing the angle of slope of the tube 36, the rate at which the pieces of food move lengthwise in the tube can be controlled. This rate of travel of the pieces of food through the tube 36 can also be controlled by changing the speed of rotation of the motor 54 (FIGURE 1); and the motor 54 is shown with a rheostat 94 which is representative of means for adjusting the motor speed to change the rate at which the tube 36 rotates.

Referring again to FIGURE 5, the sleeve 90 and vertical element 14 are shown with openings 96 for receiving a pin 98. This pin is inserted through the openings 96 which happen to be in register with one another when the bracket 86 and wheel 80 have been moved down far enough to obtain the desired angle of slope of the tube 36. The pin 98 is representative of means for adjusting the slope of the tube 36. The caster wheel 90 is shown with a brake 100 for holding the carriage at any set location.

Referring again to FIGURE 1, the food pieces to be frozen are dropped into a hopper 102 supported from the carriage frame by supporting braces 104 and 105. The hopper 102 has a sloping bottom wall 106 with its lower end substantially flush with the inside wall 48 of the tube 36. This bottom wall 106 may be curved or flat and is preferably located so as to be flush with or slightly above the various panels of the inside wall 48 for all angular positions of the tube 36 about its longitudinal axis. Thus the pieces of food in the hopper 102 are free to slide into the interior of the tube 36 as they are displaced from the hopper by the weight of additional food inserted into the hopper.

There are two horns 110 and 111 in the hopper 102 above the hopper bottom 106 and in position to discharge carbon dioxide snow downwardly into the hopper. Each of the horns 110 and 111 includes a nozzle 114 from which liquid carbon dioxide is discharged under pressure and with sudden expansion to produce snow within the horn. Only one horn is sufficient if it is made of large enough size and if it is oriented so as to discharge snow across the full width of the hopper bottom 106. The horn should also discharge some snow against the side walls of the hopper 102; and in the operation of the apparatus, the bottom and sides of the hopper 102, near the inlet end of the tube 36, are coated with snow before dropping food into the bottom of the hopper. This prevents food from sticking to the hopper, particularly when food is wet and the moisture likely to freeze instantly upon contact with the carbon dioxide snow. The snow dropping on the food pieces in the hopper also prevents them from sticking to each other as moisture on the surface of the pieces freezes.

If desired, nozzles for generating snow within the tubes 36 can be used, but unless the tube is very long, it is preferable to introduce all o fthe snow into the tube 36 with the food at the inlet end of the tube. Another advantage of generating the carbon dioxide snow at the hopper and outside of the tube 36 is that it permits convenient recapture of gaseous carbon dioxide from the horns 110 and 111 which does not form snow at the nozzle.

The tube 36 is rotated to tumble the snow and the pieces of food as they advance along the length of the tube at a rate which is dependent upon the slope of the longitudinal axis of the tube, as previously explained. The length of time that it takes for the pieces of food to travel the length of the tube should be sufficient to obtain the desired freezing. In some cases it may be desirable to freeze the pieces solid, but in other cases, it is sufficient to obtain "crust freezing," and the completion of the freezing is carried out after the pieces leave the tube 36. Experience has shown that shrimp becomes solidly frozen in three minutes of travel in the tube 36. This value is given merely by way of illustration.

Regardless of the extent of freezing desired for any particular operation, greater efficiency is obtained if the rate of travel of the food through the tube 36 is correlated with the rate of heat transfer from the snow to the food pieces so that the snow is all sublimed just as the food pieces reach the discharge end of the tube 36. This means that the entire length of travel of the food pieces through the tube 36 has been used for contact with refrigerant, but no refrigerant is wasted by discharging from the delivery end of the tube. Greater capacity of the apparatus can be obtained by using more snow and by having some substantial quantity of snow mixed with the food particles as they are discharged from the tube. This represents a case of operating at less efficiency as to refrigerant in order to obtain higher output from the equipment.

At the outlet end of the tube 36, the food pieces drop from the tube 36 into a container 120; but the apparatus can also be used with a continuous conveyor 122 supplying food pieces to the hopper 102; and with a continuous conveyor 124 carrying the frozen food away from the discharge end of the tube 36.

The apparatus of this invention is useful for a wide variety of food. In addition to shrimp, which has already been mentioned, and diced meat, the invention can be used for vegetables such as peas and can also be used for egg powder. It is preferable to have pieces of approximately the same size so that they travel through the tube at approximately the same rate of speed. It will be evident, however, that the shape of the pieces will influence their rate of travel longitudinally of the tube as the result of tumbling. However, the carbon dioxide snow has the beneficial effect of preventing particles from rolling easily and thus tends to equalize the rate of advance through the tube. If the pieces of food reach the discharge end of the tube too quickly, and without the desired freezing, their rate of travel can be reduced by lowering the inlet end of the tube so that it has less slope. The travel can also be influenced by speeding up or slowing down the motor 54 so as to increase or reduce the rate of tumbling, as previously explained. The rate of rotation of the tube is not affected by changing its slope.

The capacity of the apparatus can be increased by having the tube 36 larger in diameter, or by increasing the slope to make pieces travel faster through the tube and with the length of the tube greater to insure adequate time for freezing.

The preferred embodiment of the invention has been illustrated and described, but changes and modifications can be made and some features can be used in different combinations without departing from the invention as defined in the claims.

What is claimed is:

1. The method of freezing food pieces in a space bounded by wall surfaces, which method comprises initially coating a wall at the beginning of said space with solid phase carbon dioxide in particulate form, placing a plurality of individual pieces on the coated wall, applying more solid phase carbon dioxide in particulate form to the surfaces of the pieces on said wall, advancing the pieces from an entrance end of the space and lengthwise of the space in intimate contact with the carbon dioxide and while the carbon dioxide sublimes as the result of heat absorbed from the food pieces, supplying an additional quantity of solid phase carbon dioxide in particulate form sufficient to freeze all of the pieces, and withdrawing the pieces in frozen condition from the opposite end of the space from said entrance end.

2. The method of freezing described in claim 1 characterized by tumbling the mixture of food pieces and carbon dioxide as they advance in said space to maintain intimate contact of the carbon dioxide and pieces, and supplying enough carbon dioxide to freeze the food pieces during the advancing of the mixture in the space and before sublimation of all of the carbon dioxide in each part of said mixture.

3. The method of freezing described in claim 2 characterized by rotating the space through which the mixture advances about an axis extending in the general direction in which the mixture advances and with a downward slope in the direction of advance so that the pieces are advanced by a gravitational force component.

4. The method of freezing pieces of food by individual quick freezing which comprises mixing a plurality of individual pieces of food together with solid phase carbon dioxide in particulate form, tumbling the mixture about a sloping axis of tumbling motion until the pieces of food are frozen, advancing the mixture transversely of the direction of tumbling motion, with the tumbling axis sloping downward in the direction of the desired transverse movement, during the cooling and freezing of the pieces, continuously withdrawing the pieces from the region of tumbling when they have travelled for a given transverse distance, and regulating the rate of transverse movement by adjusting the slope of said axis to a rate of transverse movement that brings the food pieces to the end of the region of tumbling at approximately the same time as substantially all of the solid phase carbon dioxide in particulate form in each portion of the mixture sublimes.

5. Apparatus for individually quick freezing of a plurality of pieces of food, including in combination a tumbling tube, said tube being open at both ends, means for supplying the pieces of food to the space within the tube at substantially atmospheric pressure, said means for supplying the pieces of food to the tube including a surface at one end of the tube independent of the tube and by which food pieces are supported before entering the tube and from which the food pieces are discharged into the tube, walls in the tube giving said space a non-circular cross-section transverse of a longitudinal axis of the tube, means for supplying solid phase carbon dioxide in particulate form to said space and to said surface for covering said surface so that the food pieces are mixed with the carbon dioxide when they enter the tube and within the tube, means for rotating the tube along its longitudinal axis to tumble the food pieces and the carbon dioxide and bearings on which the tube is rotatably supported within its longitudinal axis at a slope to the horizontal so that the food pieces and carbon dioxide are advanced along the length of the tube by gravity.

6. Apparatus for individually quick freezing of a plurality of pieces of food including in combination a tumbling tube, means for supplying the pieces of food and solid phase carbon dioxide in particulate form to the space within the tube at substantially atmospheric pressure, walls in the tube giving said space a non-circular cross-section transverse of a longitudinal axis of the tube, means for rotating the tube about its longitudinal axis to tumble the food pieces and the carbon dioxide, the tube being open at both ends, the means for supplying the pieces of food and carbon dioxide to the tube including a surface at one end of the tube independent of the tube and by which food pieces are supported before entering the tube and from which the food pieces are discharged into the tube and including also a generator located in position for supplying solid phase carbon dioxide in particulate form to cover said surface with carbon dioxide so that the food pieces are mixed with the carbon dioxide when they enter the tube, bearings on which the tube is rotatably supported with its longitudinal axis at a slope to the horizontal so that the food pieces and carbon dioxide are advanced along the length of the tube by gravity, a hopper at the end of the tube at which the food pieces and carbon dioxide are placed in the tube, said surface being a sloping bottom of the hopper, and the means for supplying the carbon dioxide in particulate form being a horn located above said surface and with its discharge end directed toward said surface, the lower end of the sloping surface being within the tube, the walls of said tube being flat panels that meet with adjacent panels at their longitudinal edges to form a lining in the tube of polygonal cross-section and heat insulation between the lining and the portion of the tube that surrounds the lining.

7. Apparatus for individually quick freezing of a plurality of pieces of food, including in combination a tumbling tube, means for supplying the pieces of food and solid phase carbon dioxide in particulate form to the space within the tube at substantially atmospheric pressure, walls in the tube giving said space a non-circular cross-section transverse of a longitudinal axis of the tube, means for rotating the tube about its longitudinal axis to tumble the food pieces and the carbon dioxide, the tube being open at both ends, the means for supplying the pieces of food and carbon dioxide to the tube including a surface at one end of the tube independent of the tube and by which food pieces are supported before entering the tube and from which the food pieces are discharged into the tube and including also a generator located in position for supplying solid phase carbon dioxide in particulate form to cover said surface with carbon dioxide so that the food pieces are mixed with the carbon dioxide when they enter the tube, bearings on which the tube is rotatably supported with its longitudinal axis at a slope to the horizontal so that the food pieces and carbon dioxide are advanced along the length of the tube by gravity, a frame that supports the bearings on which the tube is rotatably supported, said bearings including circumferential rings around the tube at longitudinally spaced locations along the tube, and rollers under the tube and on which the rings turn to obtain antifriction bearing support for the tube, each of the rings being of channel cross-section with the rollers running in the channels to prevent axial displacement of the rings and tube with respect to the rollers, auxiliary rollers carried by the frame in position to bear against the side of one of the rings on that side of the ring that faces in the direction of the lower end of the tube, the rollers and auxiliary rollers being carried by an upper portion of the frame, wheels supporting the frame and giving the frame portability, the wheels at one end of the frame being connected to the frame by telescopic vertical elements that are extended to raise one end of the frame with respect to the other to change the slope of the tube, means for locking the telescopic vertical elements at different positions of extension, and the means for rotating the tube including a motor and motion-transmitting means between the motor and the tube including a chain and sprocket drive for the tube, said motor and motion-transmitting means being carried by the frame and being adjustable as a unit with the frame to change the slope of the tube.

8. The apparatus described in claim 6 characterized by the lining having the cross section of a pentagon, and the heat insulating being a plastic foam that holds the panels of the lining against radial displacement, all of the walls in said space within the tube being panels of said pentagon lining.

9. The apparatus described in claim 5, further including means for adjusting the slope of the tube to change the gravitational component of force that advances the food pieces and the carbon dioxide lengthwise of the tube, and the means for rotating the tube including a motor and a speed adjustment for the motor to regulate the rate of rotation of the tube.

10. The apparatus described in claim 9 characterized by a frame that supports the bearings on which the tube is rotatably supported, the frame having vertical elements at the end of the frame corresponding to the inlet end of the tube, the vertical elements having telescoping parts that extend vertically to raise and lower that end of the frame, and means for locking the telescoping element in different extended positions to regulate the angle of slope of the tube.

11. The apparatus described in claim 5 characterized by the means for supplying the pieces of food to the tube including a conveyor at the inlet end of the tube and part of which is said surface independent of the tube, and another conveyor at the outlet end of the tube and onto which pieces of frozen food are discharged from the lower end of the tube as said pieces drop out of the tube by gravity.

References Cited by the Examiner
UNITED STATES PATENTS

| | | | |
|---|---|---|---|
| 2,284,270 | 5/42 | Eberts et al. | 62—381 X |
| 2,523,258 | 9/50 | Ransogoff | 51—164 |
| 2,682,732 | 7/54 | Hanrahan et al. | 51—164 |
| 2,893,216 | 7/59 | Seefeldt et al. | 62—384 |
| 3,007,801 | 11/61 | Lapeyre et al. | 99—195 |

ROBERT A. O'LEARY, *Primary Examiner.*

Notice of Adverse Decision in Interference

In Interference No. 96,079 involving Patent No. 3,213,634, A. J. Granata, METHOD AND APPARATUS FOR INDIVIDUAL QUICK FREEZING, final judgment adverse to the patentee was rendered Aug. 12, 1968, as to claims 1, 2 and 3.

[*Official Gazette October 29, 1968.*]